(12) United States Patent
Lin

(10) Patent No.: US 6,941,471 B2
(45) Date of Patent: Sep. 6, 2005

(54) SECURITY POLICY APPLIED TO COMMON DATA SECURITY ARCHITECTURE

(75) Inventor: Along Lin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 735 days.

(21) Appl. No.: 09/761,959

(22) Filed: Jan. 17, 2001

(65) Prior Publication Data

US 2001/0018746 A1 Aug. 30, 2001

(30) Foreign Application Priority Data

Jan. 19, 2000 (EP) .............................................. 00300346

(51) Int. Cl.⁷ ................................................. G06F 1/00
(52) U.S. Cl. ........................ 713/201; 713/200; 713/187; 713/189; 713/191
(58) Field of Search ................................ 713/191, 189, 713/200, 187

(56) References Cited

U.S. PATENT DOCUMENTS

| | | | | |
|---|---|---|---|---|
| 6,018,617 A | * | 1/2000 | Sweitzer et al. | ........... 358/1.15 |
| 6,314,415 B1 | * | 11/2001 | Mukherjee | .................... 706/47 |
| 6,510,468 B1 | * | 1/2003 | Hayne | ......................... 709/246 |
| 6,519,601 B1 | * | 2/2003 | Bosch | ......................... 707/100 |
| 6,715,077 B1 | * | 3/2004 | Vasudevan et al. | ......... 713/191 |

OTHER PUBLICATIONS

Common Security Services Manager, Application Programming Interface (API), Draft for release 1.2, Intel Corporation, Mar. 1997.*

"Common Data Security Architecture Specification" Draft Release 1.2, Intel Corporation, Mar. 1997.*

Engel, J. "Programming for the Java Virtual Machine", Jun. 22, 1999, Chapter 13.*

"Intel Security Program," XP–002152323, Intel Corporation, 'Online! (1998).

"Accessing the Intel Random Number Gernerator with CDSA," XP–002152324, Intel Corporation, 'Online! (1999).

Foster et al., "A computational framework for telemedicine," XP–004129625, *Future Generations Computer Systems 14*, pp. 109–123 (1998).

Chu et al., "REFEREE: trust management for Web applications," XP–004095294, *Computer Networks and ISDN Systems 29*, pp. 953–964 (1997).

* cited by examiner

*Primary Examiner*—Gregory Morse
*Assistant Examiner*—Tongoc Tran

(57) ABSTRACT

An improved architecture is provided, based upon the prior art common data security architecture, with the modification of adding in a generic trust policy library (217) at an add-in security modules layer (215) and a policy interpreter (224) at a common security services manager layer (202), so that individual users may provide sets of trust policies in the form of a trust policy description file (223), which uses a generic policy description language provided by the architecture. The architecture provides a generic method of incorporating trust policies into a computing platform in a manner which avoids a prior art problem of the semantics of trust policies which are hard-coded in prior art trust policy modules (117). The architecture also improves management flexibility. In the present disclosure, a generic policy description language is provided, which enables different users to define the semantics of a plurality of trust policies.

9 Claims, 5 Drawing Sheets

User_can_transfer_from_accountA_to_accountB_by_pounds (U,A,B,P):-

P < 10000.00, balance_of_account (BalanceA),    // The balance of account A is Balance.

P < Balance, owner_of_account (U,A),    // The user is the owner of bank account A.

owner_of_account (U,B).    // The user is the owner of bank account B.

Fig. 3

SECURITY POLICY APPLIED TO COMMON DATA SECURITY ARCHITECTURE

FIELD OF THE INVENTION

The present invention relates to improvements in security architecture of computer platforms, and particularly although not exclusively, to improvements in policy-based security and trust management in the Common Data Security Architecture (CDSA).

BACKGROUND TO THE INVENTION

With the wide acceptance of the Internet and the World Wide Web, it has become much easier for users to access various resources such as documents, directories, databases, web pages and services using Common Gateway Interfaces (CGIs) or Servlets over the Internet. This has given rise to some serious security issues relating to access of data on individual computing resources such as authentication of users, integrity checking of users platforms, privacy and security of data, and authorization to access data.

Known prior art security systems include Microsoft's Cryptographic API (CryptoAPI), which is dependent upon the Internet Explorer 3.x or above and Windows NT 4.0, and the known Sun Microsystems' Java Cryptography Extension (JCE) is similarly platform dependent being based upon a Java platform. Each of these prior art security systems are dependent upon a proprietary operating system or platform. The Intel's prior art Common Data Security Architecture (CDSA) is applicable over a wide range of computer platforms and operating systems. The Common Data Security Architecture provides a flexible and extensible framework allowing software and hardware produced by independent vendors to provide added-in security services in a computer platform environment. The Common Data Security Architecture is an open and industry accepted standard, supporting interoperability between platforms, platform independence and a comprehensive set of security services. Since the Open Group adopted its initial specification in December 1997, CDSA has been widely supported. Referring to FIG. 1 herein, the current prior art CDSA version 2.0 has the following 4 layers:

An applications layer 100

A layered services layer 101, having a set of security services protocols, a language interface-adapter and tools A Common Security Services Manager (CSSM) layer 102

An add-in security modules layer 103, having facility for a plurality of add-in security modules such as a Cryptographic Service Provider (CSP) modules, Certificate Library (CL) modules, Trust Policy (TP) modules, Authorization Computation (AC) modules and Data Storage Library (DL) modules.

The application layer 100 has a set of security applications, which are contained in the layer; the layered service layer 101 comprises typically a set of security services protocols such as HTTPS, S/MIME, SSL, or SET; the CSSM layer 102 contains a set of management modules 104–109, a set of integrity services for checking the integrity of modules, a manager of security contexts for security services, and a set of interfaces 110–115; and the add-in security modules layer 103 has a set of user configurable security services modules 116–121 which may be proprietary and vendor-specific, and which can be accessed by the CSSM via the Interfaces 110–115 in the CSSM layer 102.

The security services management modules 104–109 comprise a Cryptographic Service Provider manager 104, a Trust Policy module manager 105; an Authorization Computation module manager 106; a Certificate Library module manager 107; a Data Storage Library module manager 108; and an elective module manager 109.

A limitation with the known Common Data Security Architecture occurs where a set of trust policies are to be implemented in a computer platform. Trust in a computing platform is a particularly important issue where computer platforms are used for electronic commerce, and handle items such as credit card numbers, automated trading programs and general commercial transactions. Trust policies comprise a set of rules which are followed by a computer platform to determine a level of confidence in the integrity of a computer platform which a user of the computer platform and/or other computer platforms interacting with the computer platform may have. For example, a user or a third party computing entity interacting with a first computing entity must have a degree of confidence that the first computing entity has not been compromised by a virus, or has not been tampered with, such that the computer platform cannot be trusted.

In the known Common Data Security Architecture, trust policies may be implemented by provision of a trust policy services module 117. However, these are proprietary and vendor specific. Each different vendor provides his own trust policy module 117, written in a set of semantics which are specific to that vendor. The semantics of a known trust policy module are completely hard-coded by its module developer. The trust policy module users must understand the semantics used by the vendor-specific trust policy module 117, so that for each trusted policy module 117, modification needs to be made to the trust policy module because of the different semantics used between different vendors. Once a trust policy module 117 is released, users are unable to add new trust policies or modify existing ones without using the vendor-specific semantics. From the user's perspective, this is not ideal, since the user may want their own specific trust policies to be enforced in their application domains instead of those policies provided and hard-coded by the vendor. The security infrastructure provided by the prior art CDSA is neither truly generic nor flexible for security and/or trust management.

In the prior art CDSA security architecture, for each trusted policy module, the semantics of a set of trust policies are determined by an individual developer. Different prior art trust policy modules written by different developers have different sets of semantics. A user may wish to change the trust policies to fit more closely the user's business organization. Because the trust policy module uses non-generic semantics, the user must return to the developer who wrote the trust policy module in order to have those changes made using the prior art security system.

SUMMARY OF THE INVENTION

One object of the present invention is to provide an improved Common Data Security Architecture (CDSA), which overcomes the problem of trust and security policy management and the problem of usage of different semantic sets used and hard-coded in different vendor-specific trust policies for a computer platform.

A second object of the present invention is to provide a security architecture in which individual users may specify their own policies to be enforced in the user's individual application domains.

A third object of the present invention is to provide an improved security architecture in which individual users may specify their own policies to be enforced, within any layer of the CDSA security architecture.

Another object of the present invention is to provide an architecture, which allows users to define their own policies using tools provided by the architecture.

According to an aspect of the present invention there is provided a security architecture for a computer platform comprising at least one data processor and at least one memory means said architecture comprising:

an applications layer for containing a plurality of user security applications;

a layered services layer for containing a plurality of security services protocols;

a common security services management (CSSM) layer underlying the layered services layer comprising a plurality of security services management means, a set of integrity services, a manager of security contexts, and a plurality of interfaces for interfacing with add-in security services modules; and an add-in security modules layer underlying the common security services manager layer, configured to accept a plurality of add-in security services modules implementing a set of standard security services;

a generic trust policy library within the add-in security modules layer and supporting a set of standard trust policy Application Programming Interfaces (APIs).

a trust policy description file comprising a set of domain-specific trust policies written in a policy description language common to said security architecture; and a policy interpreter, said policy interpreter operating to interpret a set of trust policies contained in said trust policy description file.

Preferably at least one of said plurality of said services management means (205–208) is provided with a corresponding respective Policy Description File (PDF) determining the policies with which said at least one security services management means operates.

Preferably at least one of said plurality of said add-in security services modules (216, 218–221) is provided with a corresponding respective Policy Description File (PDF) determining the policies with which said at least one add-in security services modules operates.

Preferably the architecture is characterized by further comprising a set of policy and model authoring tools (400), allowing a user to create a policy description file implementing a set of user specified policies for controlling said computer platform.

Said policy description language preferably comprises a known PROLOG language.

Preferably said policy interpreter (510) comprises a PROLOG inference engine.

Said security services management layer (502) is provided with its own policy description file (520) for implementing policies in that layer.

Said applications layer (500) may be provided with an applications layer policy description file (54) for determining policies to be implemented to said applications layer.

Said layered services layer (501) may be provided with a layered services policy description file (506) for determining policies followed by said layered services layer.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 3 illustrates schematically an example of an authorization policy, which is described in a trust policy description file created by a user for attachment to the Common Data Security Architecture according to the specific implementation of the present invention;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
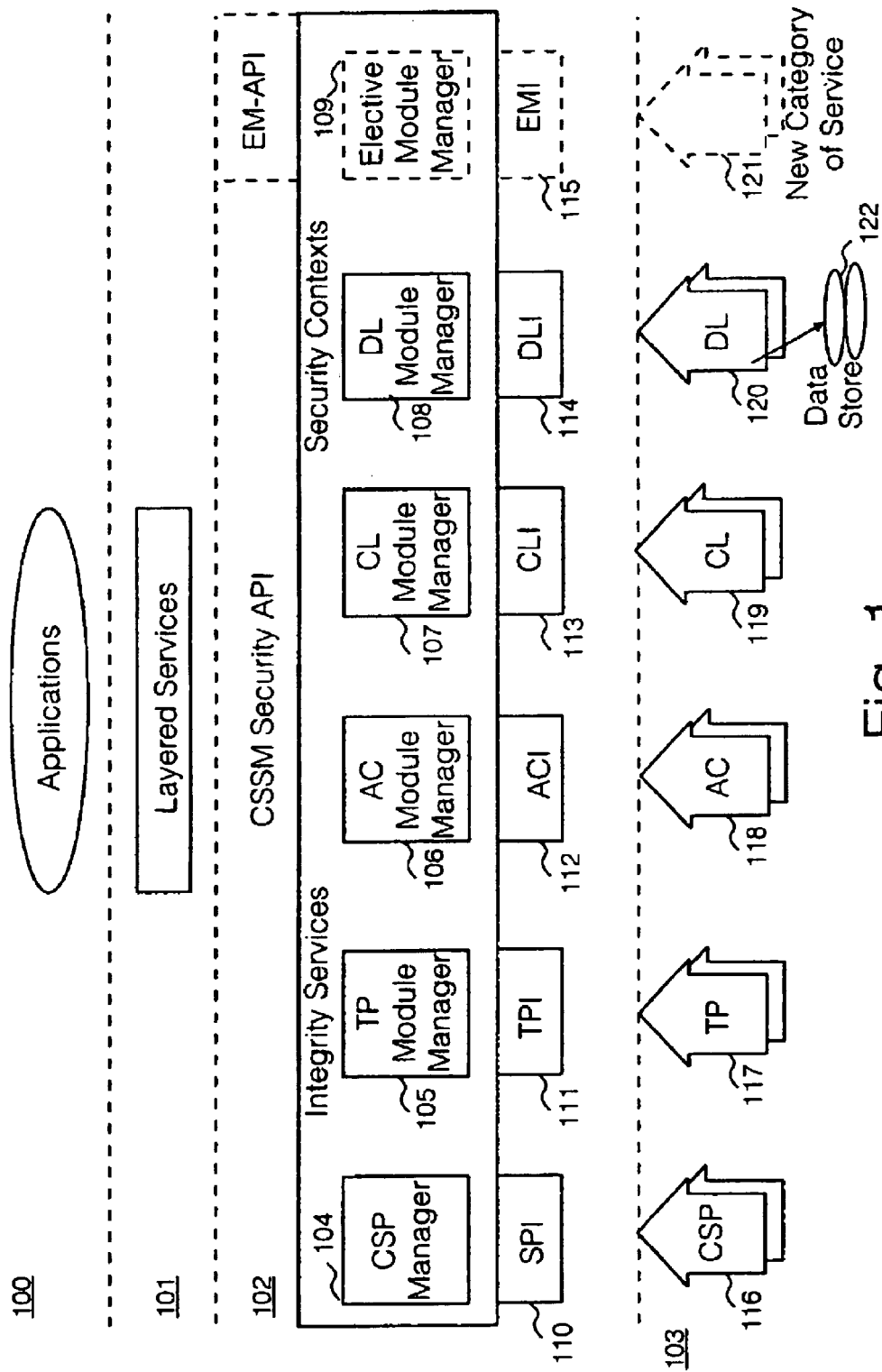
FIG. 1 illustrates schematically the prior art 4-layer Common Data Security Architecture version 2.0.
Figure 2:
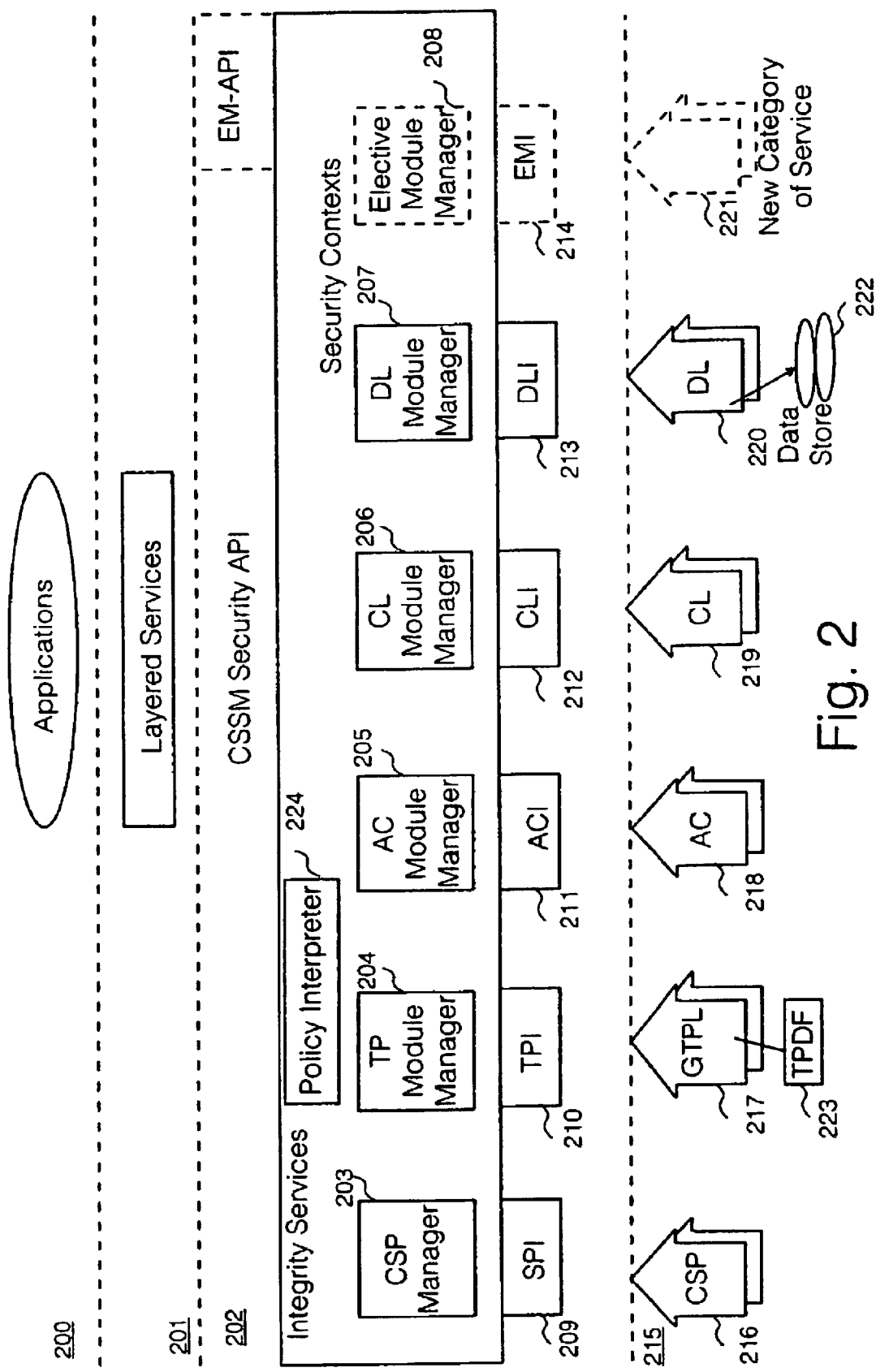
FIG. 2 illustrates schematically an improved Common Data Security Architecture according to a first specific prototype implementation of the present invention.

Referring to FIG. 2 herein, there is illustrated schematically a security architecture according to a first specific prototype implementation of the present invention. The security architecture is based upon an improvement to the known Common Data Security Architecture version 1.2, and using the known Netscape Directory Server, version 4.0, both of which are compatible with a Hewlett Packard HP-UX 11.0 operating system. The security architecture comprises an application layer 200 in which a set of security applications are contained; a layered services layer 201 comprising a set of security services protocols which may include: HTTPS, S/MIME, SSL or SET; a language interface-adapter, tools 400 for policy and model authoring or the like; a Common Security Services Manager (CSSM) layer 202 containing: a set of security management modules 203–208; a set of integrity service for checking the integrity of modules, a manager of security contexts for security services, a policy interpreter 224, and a set of interfaces 209–214; an add-in security services modules layer 215 comprising a set of user configurable security services modules 216–221, which may be proprietary and vendor-specific containing a set of standard APIs, and which communicates with the CSSM via the interfaces 209–214. In the Common Security Services Management (CSSM) layer 202, there is an Application Programming Interface (API) for interfacing between the application layer 200, and the CSSM layer 202.

The security management modules include a Cryptographic Service Provider (CSP) manager 203, a Trust Policy (TP) module manager 204, an Authorization Computation (AC) module manager 205, a Certificate Library (CL) module manager 206, a Data Storage Library (DL) module manager 207, and an elective module manger 208.

The security architecture includes in the add-in security modules layer 215 a generic trust policy library 217, which communicates through trust policy interface 210 and operates based upon the policies described in a trust policy description file 223. The policy interpreter 224 communicates with a generic trust policy library 217.

The external trust policy description file 223 is specific to an application domain and may be created by a user using policy and model authoring tools 400. The semantics of each user's trust policy is completely defined by the external trust policy description file 223 of that user.

The combination of the generic trust policy library 217 and one specific trust policy description file 223 replaces the prior art trust policy module 117 in the known Common Data Security Architecture. Because the trust policy library 217 is generic, the prior art trust policy library 117, which is non-generic and specific to a prior art trust policy module developer, can be replaced by the trust policy description file 223.

The generic trust policy library 217 provides a set of module management services for the attachment/detachment of the trust policy description file 223 to/from the CSSM. After a trust policy description file 223 has been created on a system, it can be attached by the Common Security Services Manager (CSSM) layer 202 and will be used by a set of trust policy services which are provided by the generic trust policy library 217 in the add-in security modules layer 215.

Policies contained in the trust policy description file 223 are implemented by a policy interpreter 224, which comprises an inference engine. The inference engine can reason whether a policy statement is true or false. In each API of the generic trust policy library 217, a call is made to the policy interpreter 224, to see whether the API can perform a particular function, each time such a function is attempted. For each particular API of the generic trust policy library 217, there is an associated trust policy in the user trust policy description file 223. This is interpreted by the policy interpreter 224 each time an operation is attempted to be carried out. For example, if it is required to revoke a certificate, prior to implementing that revocation, the relevant API in the generic trust policy library 217 used for revoking a certificate would make a procedural call to the policy interpreter 224, which would then interpret the policies in the trust policy description file 223 to see whether the revoker can be trusted to revoke the certificate. The trust policy description file 223 may require that the user have a digital certificate issued by a trusted Certificate Authority (CA), e.g. Baltimore, Entrust or similar before it trusts the user to revoke a particular certificate. If a user has a digital certificate certified by Baltimore and Baltimore is a trusted CA, then the user will be trusted to revoke a certificate.

A trust policy may be 'if a user has a digital certificate cross-certified by at least two trusted Certificate Authorities (CAs), then the user can be trusted to revoke the certificates'. A different user may implement a different trust policy as follows 'if the user has a digital certificate certified by one of the trusted CAs, then the user is trusted to revoke the certificates'. These two trust policies can be implemented by two different users using the same architecture according to the best mode herein, by each user having different trust policy description files 223, but using the same policy interpreter 224 and generic trust policy library 217 provided by the architecture described herein.

In the best mode herein, the policy interpreter 224 and the generic trust policy library 217 are developed once, and any changes to a user's trust policies are made by a user's changes to its trust policy description file 223, using the policy and model authoring tools 400.

The policy description language defines a language for setting security policies. Known prior art security policy description languages are either too specific or too complicated for a non-programmer to use. There is a problem in designing a language that is both simple and expressive. Conventional programming languages may be used within the generic trust policy library 217, but the policy description language must have at least several of the following features.

The policy description language is easy to use so that writing a policy should be as easy as describing what the policy is.

The language should have good programmability.

The language should be simple yet expressive enough to support writing a variety of policies.

The language should be capable of specifying both security policies and domain specific trust policies.

The language should support writing of a set of policy templates. Policy templates comprise pre-set policies that are more succinct than instantiated policies. The language should support writing of policies having variables.

The language should have the feature of reasonability. For example, answering the question 'is the user trusted to perform an operation of some resource' needs to be reasoned about, if a trust relationship can be derivable from a set of trust policies stored in the trust policy description file. Furthermore, checking for policy conflicts requires an element of reasoning supported by the policy description language.

The language should be capable of refinement. Because policy development is process of converting a high-level policy specification to a machine understandable code, support of incremental policy prototyping and refinement should be a feature of the policy description language.

The language should have a unified mechanism. Policies, credentials and trust relationships should be represented and processed in a unified manner, rather than being dealt with separately.

In the best mode herein, the prior art programming language PROLOG (PROgramming in LOGic) is used for the policy description language. PROLOG is suitable for use as a language for specifying security policies due to its following characteristics.

PROLOG is declarative. A rule in PROLOG defines a relationship between several objects. A security policy can be described as a rule in PROLOG. Furthermore, specifying a trust policy in PROLOG is almost as simple as describing what the trust relationship is.

In PROLOG, rules can contain variables so that the PROLOG language supports writing policy templates.

PROLOG is capable of reasoning from a set of rules supporting both policy evaluation and policy conflict detection.

Data structures in PROLOG are uniformly expressed structures. Therefore, all security objects can be represented in a unified manner, thus simplifying their processing.

PROLOG is a productive modeling language supporting both incremental policy writing and policy refinement.

PROLOG also provides a procedural interpretation, so that actions can be performed when necessary.

PROLOG is based on Horn Clauses, which are a subset of the First Order Logic (FOL) that provides a solid mathematical foundation for general policy compliance checking.

In a prototype best mode implementation based on HP-UX 11.0, the PROLOG language is adopted as a final policy representation language, and a shared library is produced to function as a policy interpreter. It has been observed that writing domain specific policies needs to model a system and an organization's business process using model authoring tools 400.

Within applications, a user first calls a Common Security Services Manager (CSSM) Applicabon Programming Interface (API), and then asks the Common Security Services Manager to attach itself to the generic trust policy library 217, which can be done during the CSSM initialization. The generic trust policy library 217 supports a PassThrough API, which can evaluate a query, based on a set of policies. In functions defining each of other API's of a standard trust policy module 117, the PassThrough function is called first to enforce the polices associated with the particular API. In this way, both the add-in security modules and the Common Security Services Manager (CSSM) are capable of enforcing their own security policies by calling the generic trust policy library PassThrough API. This is a significant advantage over the original prior art Common Data Security Architecture (CDSA) framework.

There will now be described an example of a policy stored in the form of a PROLOG statement in a users' trust policy description file 223.

Referring to FIG. 3 herein, there is defined an example of a authorization policy stating that a bank account owner (U) can transfer an amount P pounds Sterling from his account A to his other bank account B, if the amount P is less than £10,000 and less than the current balance of the account A. In the rule shown in FIG. 3, the account number A, account number B, amount P and the balance (Balance) of account A are logical variables, which are only valid within the described rule.

In the example of FIG. 3, a method is used to retrieve external information about a bank account. If the statement balance_of_account (Balance, A)

is evaluated as true, the logical variable Balance will be unified to the real balance of the bank account A. Furthermore, we assume the relationship Owner_of_account (U,A) has also been defined in a model.

When a user wants to transfer money between its two bank accounts A, B, this can be done if the above policy is evaluated as true. Otherwise, the user is not trusted to transfer the money.

In the above example, the policy as illustrated in FIG. 3 is stored in a trust policy description file 223 created by a service provider, and is interpreted by the policy interpreter 224. The generic trust policy library 217 performs the function of the attachment/detachment of the trust policy description file 223 to/from the CSSM.

Figure 4:
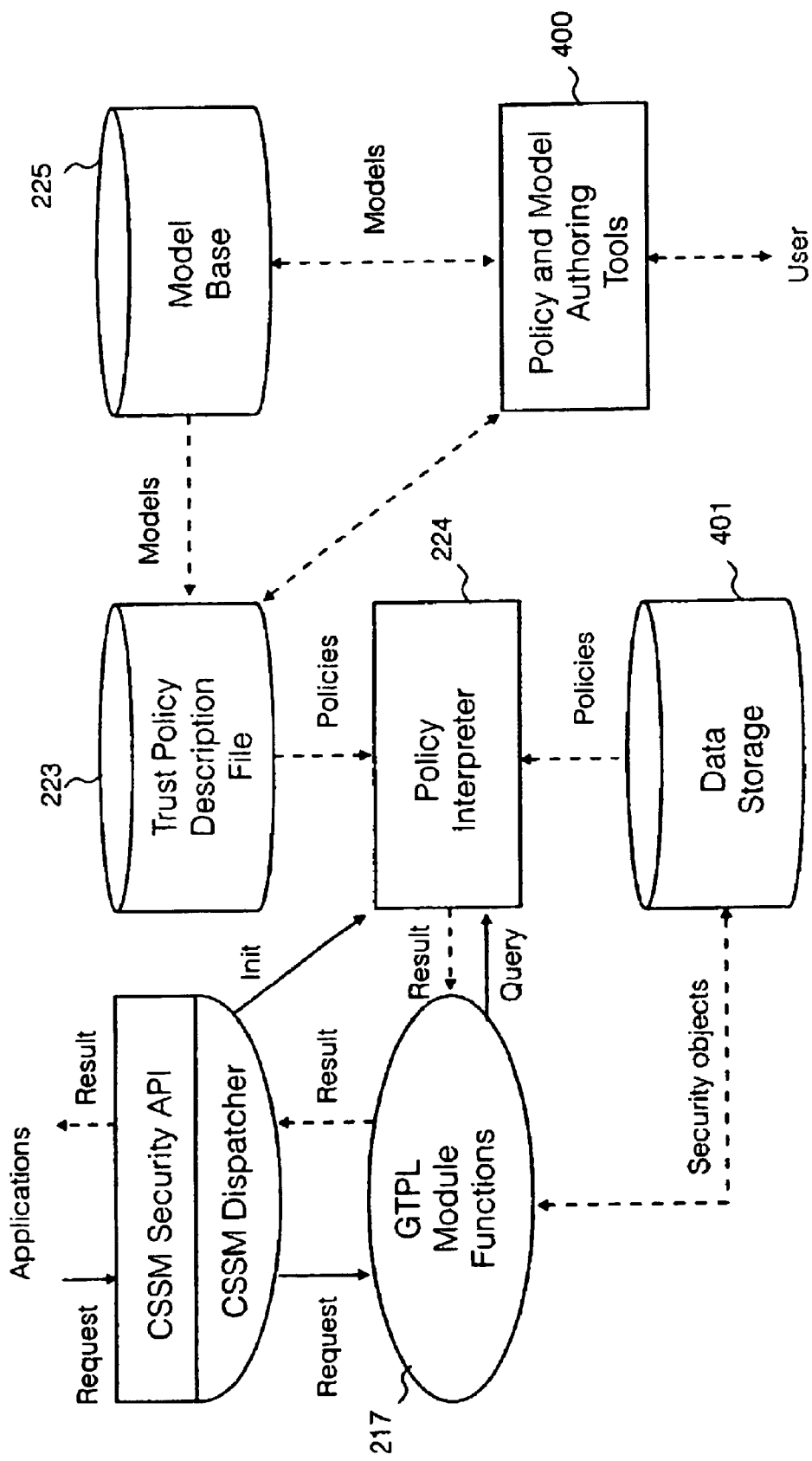
FIG. 4 illustrates schematically a data flow diagram for usage of the improved Common Data Security Architecture of FIG. 2 herein.

Referring to FIG. 4 herein, there is illustrated schematically a mechanism for enforcement of policies in the architecture according to the best mode of the present invention. In order to make use of the architecture, a user needs to provide a set of trust policies in a trust policy description file 223, which is provided by the user. The generic trust policy library 217 is pre-determined and is created once for the add-in security services layer 215. This simplifies the development of the prior art trust policy modules 117. There are provided within the layered services layer 501 a set of policy and model authoring tools 400 enabling the user to develop the Trust Policy Description File (TPDF). The generic trust policy library 217 is separate from the policy interpreter 224. The semantics of a trust policy is completely defined by its corresponding trust policy description file 223 created by the user using the policy and model authoring tools 400. Because the trust policy description file 223 has been created using a common policy description language, the trust policy description file is already in a generic format understandable by the architecture, and transferable to another computer platform having the same architecture. As illustrated in FIG. 4, trust policies may also be retrieved from a data storage device 401, to which they may have been pre-written.

Figure 5:
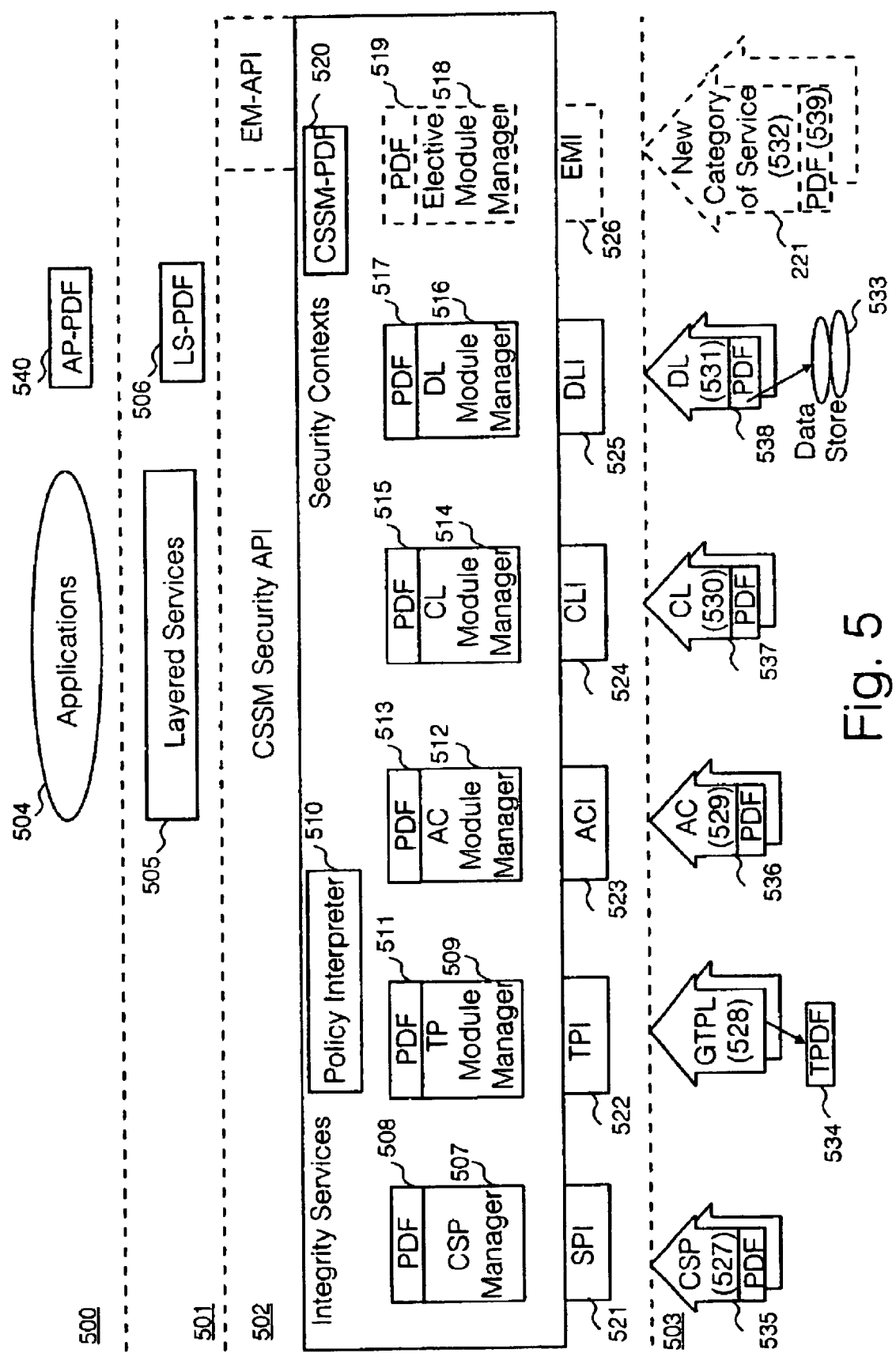
FIG. 5 illustrates schematically a second improved Common Data Security Architecture according to a second specific embodiment of the present invention.

Referring to FIG. 5 herein, there is illustrated schematically a second specific implementation according to the present invention. The architecture of the second specific implementation is based on that as described previously with respect to the first specific implementation. The architecture comprises an applications layer 500, a layered services layer 501, a Common Security Services Manager (CSSM) layer 502, and an add-in security services modules layer 503. In the applications layer 500, there is provision for a plurality of security applications 504, and an application policy description file 540 containing a set of user specified policies applicable to the applications domain. In the layered services layer 501, there are provided a plurality of layered services 505 as described herein before, and additionally a layered services policy description file 506 containing a set of policies applicable to the services contained in the layered service layer 501. In the Common Security Services Manager (CSSM) layer 502, there is provided a set of management modules, a set of integrity services, a security contexts manager, a policy interpreter 510, tools for policy and model authoring or the like, interfaces 521–526 via which CSSM communicates with add-in security modules 527–532 as described herein before, and a CSSM policy description file 520 comprising policies applicable to the operation of the CSSM layer 502. In the add-n security modules 503, there are provided CSP modules 527, one generic trust policy library 528 and one or more trust policy description files 534, AC modules 529, CL modules 530, DL modules 531, and elective modules 532 for provision of new services which can be elected and specified by a user. Furthermore, add-in security modules 527, 529–532 can also be extended by their respective policy description files 535–539.

Management modules comprise a Cryptographic Service Provider (CSP) manager 507 and additionally a CSP manager policy description file 508 containing policies applicable to the CSP manager; a Trust Policy (TP) module manager 509 and additionally a TP manager policy description file 511 containing is policies applicable to the TP manager; an Authorization Computation (AC) modules manager 512 and additionally an AC manager policy description file 513 containing a set of policies applicable to the AC module manager; a Certificate Library (CL) module manager 514 and additionally a CL manager policy description file 515 containing policies applicable to the CL module manager; a Data Storage Library (DL) module manager 516 and additionally a DL manager policy description file 517 containing policies applicable to the DL module manager; an elective module manager 518 and additionally an elective module manager policy description file 519 containing policies applicable to the management of the elective modules.

Security policies in each layer in the architecture are implemented by individual policy description files, which may be defined by a user or a vendor.

Each module manager within the Common Security Services Manager (CSSM) layer 502 may therefore have its own set of policies, which can be module manager developer defined using tools as described with reference to FIG. 2 herein in a language common to the architecture. At each level, the user has control over the security policies applied in each layer, by setting the policies in that layer using the tool set provided within the architecture. Additionally, within individual add-in security modules themselves, for example the data storage library 531, a user may also create a specific policy description file 538 for controlling access to the data within a data store 533. An example policy can be as follows: 'a user of an application is not allowed to store private key data into a local file system based data storage'. This policy may be stored in a policy description file 538 associated with the data storage library 531. Another policy may be 'if a user wishes to access policy data stored in a data storage device, then the user must authenticate itself to the data storage device'.

Each policy description file is interpreted by the single policy interpreter 510, which is provided within the Common Security Services Manager (CSSM) layer 502. Additionally, the CSSM layer itself has a policy description file 520 whereby a user can describe policies with which the CSSM operates, using the common tools set provided within the layered services layer 501 as herein described with reference to FIG. 2. For example, the CSSM may implement its own policy stored in a CSSM specific policy description file 520 as follows: 'The CSSM can only attach itself to security modules which have been signed by those module developers who have digital certificates issued by the CSSM vendor'.

There is provided both a Dynamic Link Library (DLL) on Windows NT 4.0 and a shared library on the HP-UX 11.0 of the policy interpreter 510, so that the Common Security Services Manager and all the add-in security modules can enforce their own policies by calling the policy interpreter directly, rather than by calling the generic trust policy library PassThrough API. One advantage of this solution is its high efficiency. In addition to this, there can be no need for a trust policy module manager 509, because the generic trust policy library 528 can become part of the Common Security Services Manager layer 502. However, from the user's perspective and for legacy prior art CDSA applications, the interface should be backwards compatible. Therefore, it is worth providing CDSA with both a shared library and an add-in security module of the generic trust policy library 528.

Various of the interfaces in the Common Security Services Manager layer, in the Cryptographic Service Provider module, Certificate Library module, and Data Storage Library module can be policy-based. Examples of these are as follows:

Cryptographic Service Provider (CSP): private key storage in a CSP may enforce a policy that the CSP must not reveal key material unless it has been cryptographically protected.

A directory-based Data Storage Library (DL): to retrieve security policies stored in the directory, users need to be authenticated by the directory server using their credentials.

Common Security Services Manager (CSSM) layer: before the CSSM attaches itself to a Cryptographic Service Provider (CSP) module, it must verify the signatures on the CSP module.

The elective module 532 is reserved for a future electable use. The elective module may be used for incorporation of a key recovery modules or a user authentication service module.

The integrity services in the CSSM layer 502 check the integrity of each add-in module and the CSSM itself. Each of the add-n security modules 527–532 must be verified based on their signatures signed by module developers. Each module has a digital certificate, which has been signed by its developer, and incorporated into the module, the certificate being trusted by the CSSM vendor.

As well as providing integrity services, the CSSM also provides security context management. For example, where different algorithms are used to sign and/or encrypt data, which can be achieved on a item by item basis, with data items using different security contexts for data signing and/or data encryption performed by the CSP. A user can use different CSPs, which may be of different manufacturers.

Another function of the CSSM layer is module management. Modules may be attached to or detached from the CSSM, which is managed by the CSSM layer. Policies governing the attachment and detachment of modules can be CSSM vendor specified in the CSSM policy description file 520. The layered services layer may also include its policy description file 506 governing the security services protocols, language interface adapter for languages such as Java and C++, and tools.

As well as policies having being applied to the application layer 500, the layered services layer 501 and the CSSM layer 502, users may define their own security and trust policies at the add-in security modules layer 503 by incorporating individual user-written policy description files into each of the Cryptographic Service Provider (CSP) modules 527, the Authorization Computation (AC) module 529, the Certificate Library (CL) module 530, the Data Storage Library (DL) modules 531, and the elective service modules 532.

The user may define his own trust policies in the user's policy description file. The trust policy description file 534 stores policies describing a set of domain specific trust policies, which determine whether a computer can be trusted to perform certain operations. For example committing a user to a financial transaction. In the best mode, using the same generic trust policy library 528, different users can each specify their own trust policy description files 534, describing their own trust policies.

An example of a policy stored in the CSP policy description file 535, within a CSP module 527 may be 'the private key of a user must never be exposed to the CSSM or the rest of the security architecture of a computer platform, unless it has been cryptographically protected.

What is claimed is:

1. A security architecture for a computer platform comprising at least one data processor and at least one memory means said architecture comprising:

an applications layer for containing a plurality of user security applications;

a layered services layer for containing a plurality of security services protocols;

a common security services manager (CSSM) layer underlying the layered services layer comprising a plurality of security services management means, a set of integrity services, a manager of security contexts, and a plurality of interfaces for interfacing with add-in security modules; and an add-in security modules layer underlying the common security services manager layer, configured to accept a plurality of add-in security modules implementing a set of standard security services;

a generic trust policy library within the add-in security modules layer and supporting a set of standard trust policy Application Programming Interfaces (APIs);

a trust policy description file containing a set of domain-specific trust policies written in a policy description language common to said architecture; and a policy interpreter, said policy interpreter operating to interpret a set of policies contained in said policy description file.

2. The architecture as claimed in claim 1, wherein at least one of said plurality of said management means is provided with a corresponding respective policy description file determining the policies with which said at least one management means operates.

3. The architecture as claimed in claim 1, further comprising a set of policy and model authoring tools, allowing a user to create said policy description file implementing a set of user specified domain-specific policies for controlling said computer platform.

4. The architecture as claimed in claim 1, wherein said policy description language comprises a known PROLOG language.

5. The architecture as claimed in claim 1, wherein said policy interpreter comprises a PROLOG inference engine.

6. The architecture as claimed in claim 1, wherein said common security services manager layer is provided with its own policy description file for implementing policies in that layer.

7. The architecture as claimed in claim 1, wherein said applications layer is provided with an applications layer policy description file for determining policies to be implemented in said applications layer.

8. The architecture as claimed in claim 1, wherein said layered services layer is provided with a layered services layer policy description file for determining policies followed by said layered services layer.

9. The architecture as claimed in claim 1, wherein at least one of said plurality of add-in security modules is provided with a corresponding respective policy description file determining the policies with which at least one add-in security module operates.

* * * * *